Patented May 19, 1953

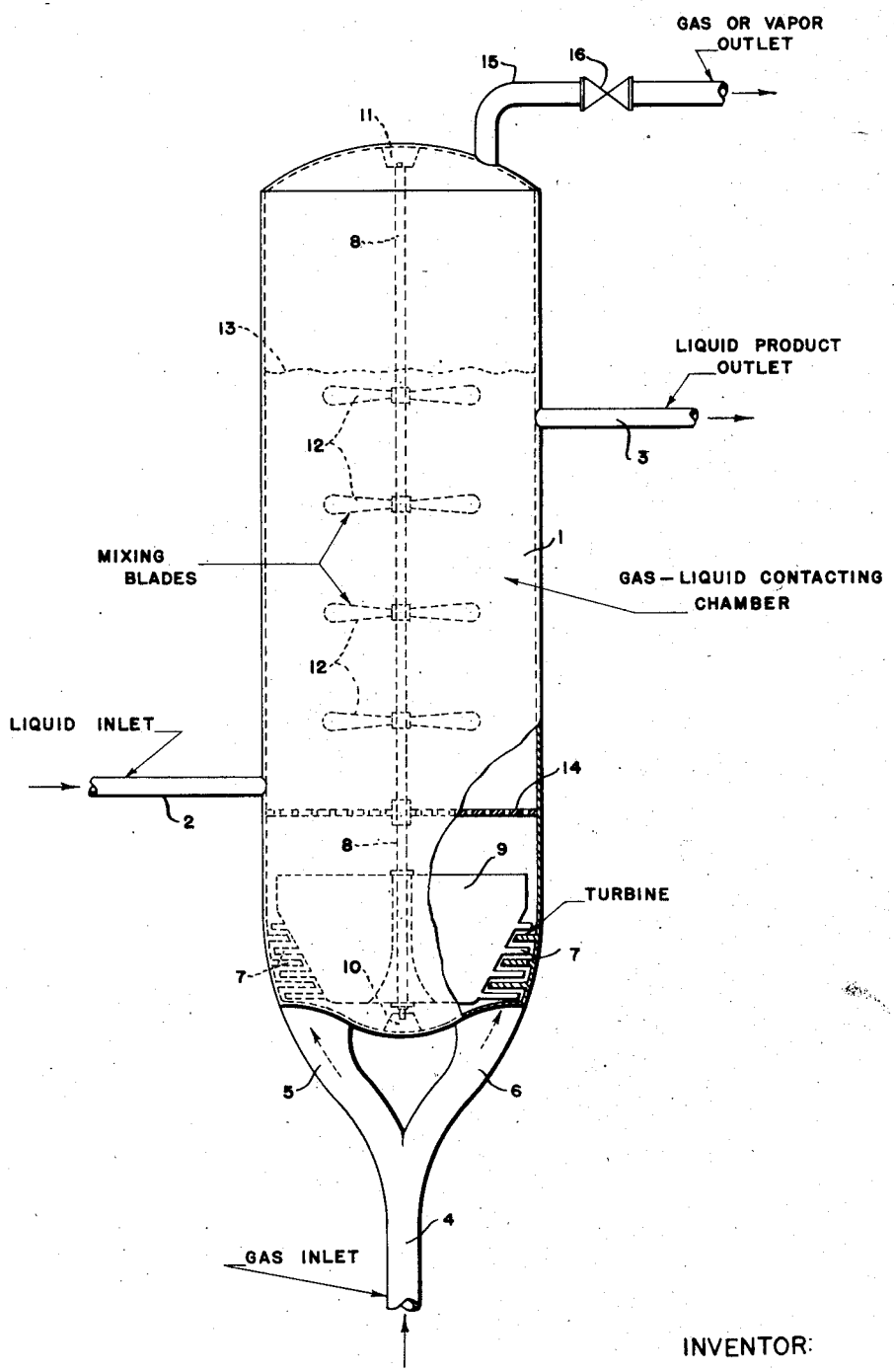

2,639,129

UNITED STATES PATENT OFFICE 2,639,129

APPARATUS FOR EFFECTING GAS-LIQUID MIXING

Armand J. de Rosset, Clarendon Hills, Ill., assignor to Universal Oil Products Company, Chicago, Ill., a corporation of Delaware Application January 31, 1951, Serial No. 208,724

3 Claims. (Cl. 261—93)

1

The present invention relates to improved means for effecting the mixing of gases and liquids in confined high pressure vessels or contacting chambers, and more specifically to the use of a turbine to receive and subsequently discharge a gaseous stream into a gas-liquid phase in a manner providing, simultaneously, the passage of the gaseous reactant stream through the turbine in order to discharge it into the liquid phase and the generation of mechanical energy which is utilized within the resulting gas-liquid phase for the more intimate contact of the mixture.

Various reactions and processes, such as hydrogenations, oxidations, chlorinations, purifications, and the like are greatly aided by the violent agitation of the gas and liquid mediums. There are of course various forms of mechanical stirrers and agitating apparatus utilized in connection with liquid-gas reaction chambers or vessels, including the turbo-mixer and the turbo-disperser type of apparatus. However, such apparatus is in general not well adapted to high pressure conversion operations utilizing 500 pounds per square inch gauge pressure or higher, and generally has mixing blades or the like which are operated by externally placed electrical motors or other power producing means, so that pressure tight seals or packing glands are necessary to accommodate the drive shafts extending into the interior of the chamber, and as a result operating pressures are in general limited to the type of seal or packing gland which is provided therewith.

It is a principal object of the present invention to provide means for effecting a high degree of mechanical agitation and stirring within a pressure tight gas-liquid reaction chamber without the use of externally positioned motors and by means eliminating the necessity of rotating seals, or packing glands and the like.

It is a further object of the present invention to provide a continuous gas-liquid mixing operation suitable for high pressure conversion conditions in a manner passing the gaseous reactant medium through a turbine inlet means maintained within the confined pressure tight reaction chamber and continuously introducing the gaseous reactant stream from the turbine into the liquid phase while simultaneously generating power from the turbine to effect a high degree of mechanical stirring and agitation within the gas-liquid phase.

In a broad aspect, the present invention embodies the mixing of gaseous and liquid mediums in a manner which comprises, continuously introducing a liquid reactant stream into a confined reaction zone and maintaining a body of liquid therein, continuously passing a gaseous reactant medium into the confined reaction zone by way of a turbine maintained entirely within said zone and effecting the discharge of the gaseous medium from the turbine directly into the body of liquid, effecting thereby the simultaneous formation of a gas-liquid phase within the reaction zone and the generation of mechanical energy from the operation of the turbine providing mechanical agitation and mixing of the gaseous and liquid mediums and continuously withdrawing resulting treated liquid and contacted gaseous streams from the confined reaction zone.

The introduction of a gaseous medium through a turbine to in turn provide mechanical agitation and stirring within a gas-liquid reaction zone may be used to advantage in many types of scrubbing, purification, or other gas and liquid contacting operations, however, it is particularly useful in connection with high pressure conversion operations where mechanical agitation and turbulence is needed within a confined reaction chamber. For example, in effecting the hydrogenation of hydrocarbon streams it is desirable to use high pressures of the order of 500 p. s. i. g. or higher and to contact the oil with the hydrogen stream under conditions of vigorous stirring and agitation. A colloidal or finely divided catalyst may also be suspended with the oil stream to aid in the hydrogenation of the oil to form the desired product stream. Various finely divided catalysts, such as molybdenum sulfide, nickel sulfide, or other nickel catalysts, may be continuously passed with the oil or liquid stream into the reaction chamber, and may be withdrawn therefrom in the liquid product stream after the oil and suspended catalyst has contacted the hydrogen stream.

In a preferred arrangement for operation of the process, the gas-liquid mixing apparatus comprises in combination, an elongated confined contacting chamber having suitable liquid inlet and outlet means, whereby the liquid reactant stream may be continuously introduced into the chamber and withdrawn therefrom while maintaining a body of liquid in the chamber, a turbine within one end of the chamber suitable to receive the gaseous stream and discharge it from the turbine into the body of liquid maintained within the reaction chamber, a rotatable shaft having mixing means attached thereto connecting with the rotor of the turbine and extending through the elongated confined contacting chamber, gas inlet means connecting to the chamber and to the inlet of the turbine and means discharging gas from the latter directly into the liquid retaining portion of said contacting chamber whereby the gaseous reactant stream passing through the turbine effects the operation of the latter and the rotation of the shaft and mixing means to agitate the liquid and gaseous mediums in the resulting gas-liquid phase, and gas outlet means from the chamber suitable to discharge the contacted gaseous medium.

In a preferred form of the apparatus, the confined chamber is elongated and has the turbine at one end thereof so that a rotatable shaft, with mixing blades or other types of agitators may extend longitudinally and axially through the length of and interior of the contacting chamber. Also, the discharge of the turbine is such that it passes the gaseous stream therefrom axially through the body of liquid within the chamber and such that an elongated gas-liquid phase is maintained in a manner that it is violently agitated by the blades of the axially positioned rotating shaft. Gas outlet means is also maintained at one end of the elongated chamber substantially opposite the end having the turbine gas inlet means, while the gas-liquid phase is maintained in an intermediate portion thereof. Baffles or perforate plate means may be utilized between the turbine and the liquid zone of the chamber, so that the pressure drop of the gaseous stream entering the liquid phase prevents the liquid from falling or flowing into the zone of the turbine.

Reference to the accompanying drawing and the following description thereof will serve to illustrate in a simplified manner the operation of the gas and liquid mixing operation of the present invention, while still further advantages will be noted in connection therewith.

Referring now to the drawing, there is indicated a vertically positioned and elongated contacting chamber 1, having liquid inlet means 2 and liquid product outlet means 3. The inlet and outlet means are spaced vertically along the wall of said chamber so that a liquid reactant stream may be continuously introduced into and withdrawn from the reaction chamber while maintaining a pool or body of liquid therein. Gas inlet means 4 is provided at the lower end of chamber 1 and in this particular embodiment splits into feed nozzles 5 and 6 which in turn pass the gaseous medium into and through a turbine 7 maintained in the lower end of the confined reaction chamber 1.

The turbine 7 is of the impulse type having one or more stages suitable to utilize the pressure of the gas charge stream for rotating a shaft 8 connecting directly to the rotor 9 of the turbine. A suitable lower bearing 10, and an upper bearing 11 at the end of the shaft 8, provide means for holding the turbine rotor and shaft in suitable axial alignment within the chamber. A plurality of spaced mixing blades 12 are attached to the rotatable shaft 8 so that a high degree of agitation and stirring may be maintained throughout the body of liquid maintained in the central portion of the contacting chamber. In the present embodiment, the upper surface of the gas-liquid phase is indicated by the broken line 13, with the rate of introduction and discharge of the liquid medium being controlled to in turn provide the desired liquid level within the chamber 1. The gaseous medium which enters the turbine 7 is discharged continuously therefrom and passes upwardly into the body of liquid maintained in the chamber. Also, in this diagrammatic embodiment, the discharged gaseous reactant stream passes through a perforated plate 14 so that the upward flow and pressure drop of the gaseous stream prevents the liquid medium from entering into the zone of the turbine 7. A resulting unabsorbed and contacted gaseous stream is continuously discharged from the upper end of the chamber 1 by way of outlet means 15 and control valve 16.

As set forth hereinbefore, the present method of contacting gas and liquid mediums may be utilized in connection with scrubbing or purification operations, or alternatively, with high pressure conversion operations wherein it is desired to effect the contacting of a liquid stream with a gaseous medium under highly agitated conditions. The gaseous stream must of course be introduced into the turbine at a substantially higher pressure than that maintained in the liquid contacting or conversion zone so that a resulting pressure drop effects the rotation of the turbine rotor and the operation of the connecting rotatable shaft 8 and its mixing blades 12. The available pressure drop of the gaseous medium within the interior of the gas-liquid contacting chamber and the design and staging of the turbine 7 of course regulate the speed of rotation and the degree of agitation which may be obtained within the mixing chamber.

In order to illustrate somewhat more specifically the operation of the unit and to provide efficient gas-liquid mixing, it may be assumed that it is desired to hydrogenate a petroleum fraction containing substantial amounts of aromatic, olefinic, sulfur, and nitrogen compounds in the presence of a suitable catalyst such as finely divided molybdenum sulfide, with the latter being carried with the oil stream in a disperse suspensoid type of flow, and with the oil and catalyst phase entering reaction chamber 1 by means of inlet line 2 with a desired high pressure and high temperature providing desired hydrogenation conditions in the presence of a hydrogen gas stream. Hydrogen is thus continuously introduced by way of inlets 4, 5 and 6 into the lower end of the chamber and through the turbine 7 such that the rotor 9 of the latter is continuously rotated at a high speed providing the continuous rotation of shaft 8 and mixing blades 12. The hydrogen leaving the turbine 7 is of course continuously passed upwardly through the baffle and distributing plate 14 and into the body of the oil and catalyst wherein it is mixed with and agitated to form a high degree of intimate contact with the liquid to in turn effect the desired hydrogenation of the oil in the presence of the molybdenum sulfide catalyst. The resulting hydrogen stream after contact with the liquid phase enters the upper portion of the contacting chamber 1 and is continuously discharged by way of outlet line 15 and valve 16. The resulting liquid product stream comprising the hydrogenated oil and suspended catalyst particles is continuously withdrawn from the upper liquid outlet means 3. The catalyst may of course subsequently be separated from the hydrogenated product stream and reactivated and reused with the liquid reactant stream being introduced by way of inlet 2. Also, the hydrogen being discharged from the upper end of the chamber by way of outlet line 15 may be recovered and recycled through the reactor, with additional hydrogen being added to the stream to provide a desired quantity of gas entering the turbine end of the reactor. Valves or other flow regulating means may of course be utilized in connection with the inlets to control and regulate the quantities and pressures of the reactant streams entering the contacting chamber to in turn regulate the gas-liquid ratios, or alternatively, in the case of the gaseous medium regulate the turbine speed and the degree of agitation obtained from the connecting rotating shaft 8 and mixing blades 12.

It is of course to be noted that the drawing is diagrammatic and that the apparatus is not limited to the type of mixing blades indicated in the drawing, for other forms of blades or stirring paddles may be well utilized within the gas-liquid mixing zone. Other forms of baffling or partitioning means may also be used between the mixing zone and the turbine to aid in preventing the liquid phase from entering into the turbine zone. Still further, it may be noted that the turbine should not be limited to any one particular type, for various forms of staged impulse type of turbines may well be utilized to in turn utilize the energy of the gaseous reactant stream for the mechanical agitation in the mixing zone receiving the liquid medium and the discharged gaseous medium. However, the turbine and the necessary bearings therefore, and for the rotatable shaft are maintained entirely within the body of the chamber 1, such that all seals or packing glands are obviated.

I claim as my invention:

1. A gas-liquid mixing apparatus comprising in combination a confined pressure tight chamber having liquid inlet and outlet means connecting thereto and a liquid retaining section therein, a turbine within one end of said chamber, gas outlet means from the opposite end of the chamber, a rotatable shaft having mixing blades extending therefrom connecting with said turbine, said shaft extending axially through the interior of said confined chamber, a gas inlet connecting to said chamber and to the intake end of said turbine in a manner operating the latter and effecting the rotation of said shaft and mixing blades, and a perforated plate extending across the interior of said chamber between said turbine and said liquid retaining section.

2. A gas-liquid mixing apparatus comprising in combination, a confined elongated pressure tight contacting chamber suitable for maintaining a body of liquid therein and having spaced liquid inlet and outlet means connecting thereto providing an elongated liquid retaining section, a turbine positioned within one end of said contacting chamber, an elongated rotatable shaft extending axially through the interior of said chamber and having spaced mixing blades extending therefrom, said rotatable shaft connecting with the rotor portion of said turbine, gas inlet means connecting to said chamber and discharging directly into the intake of said turbine, a perforated plate extending across the interior of said chamber between said turbine and the liquid retaining section, and gas outlet means connecting with said contacting chamber at the end thereof substantially opposite said turbine and said gas inlet means.

3. The apparatus of claim 2 further characterized in that bearings for said turbine rotor and said shaft are provided within the interior of said pressure tight chamber whereby all moving parts are maintained therein.

ARMAND J. DE ROSSET.

References Cited in the file of this patent

UNITED STATES PATENTS

| Number | Name | Date |
|---|---|---|
| 1,505,204 | Kierman | Aug. 19, 1924 |
| 1,854,754 | Morris | Apr. 19, 1932 |
| 1,893,849 | Sullivan | Jan. 10, 1933 |
| 2,389,524 | Loewenstern | Nov. 20, 1945 |